United States Patent [19]

Katoh

[11] Patent Number: 5,665,025
[45] Date of Patent: Sep. 9, 1997

[54] ENGINE CONTROL LINKAGE

[75] Inventor: Masahiko Katoh, Hamamatsu, Japan

[73] Assignee: Sanshin Kogyo Kabushuki Kaisha, Hamamatsu, Japan

[21] Appl. No.: 573,662

[22] Filed: Dec. 18, 1995

[30] Foreign Application Priority Data

Dec. 16, 1994 [JP] Japan .................. 6-313184

[51] Int. Cl.$^6$ .................. F16H 59/24; F16H 59/68; G05G 9/08
[52] U.S. Cl. .................. 477/107; 74/480 B; 440/84; 477/101; 477/102
[58] Field of Search .................. 74/480 B; 477/101, 477/102, 107, 111; 440/84

[56] References Cited

U.S. PATENT DOCUMENTS 4,470,492 9/1984 Kobelt .................. 74/480 B X
4,602,602 7/1986 Donohue .................. 477/102 X
4,966,115 10/1990 Ito et al. .................. 477/102 X
4,986,776 1/1991 Hensel et al. .................. 477/102 X

*Primary Examiner*—Allan D. Herrmann
*Attorney, Agent, or Firm*—Knobbe, Martens, Olson & Bear LLP

[57] ABSTRACT

An engine control system wherein the engine throttle valve is maintained in a substantial partially opened position at idle and the desired idle speed is maintained by controlling the spark advance. A lost motion connection connects the operator engine speed control with the throttle control so that when the operator speed control reaches a pick up position, the lost motion will be taken up and normal throttle opening will occur. This improves transient running. The system includes arrangements for detecting wear or other changes in the operative condition and compensating for it.

8 Claims, 10 Drawing Sheets 5,665,025

ENGINE CONTROL LINKAGE

BACKGROUND OF THE INVENTION

This invention relates to an engine control and more particularly an improved engine control system that accommodates and compensates for wear or changes in the condition of the control linkage.

There has been proposed a type of engine control wherein the throttle valve of the engine is maintained in a substantial partially opened condition at idle. The idle speed is maintained by controlling the ignition system or fuel system of the engine to maintain the desired speed which speed would be lower than that at which the engine would run due to the opening of the throttle valve. In this way, throttle response can be improved, particularly at transient conditions when operating in the off idle mode.

Normally many engine controlled Systems, including the one described, utilize a position sensor for sensing the position of the throttle valve as an indication of operator demand in their control strategy. Obviously with an arrangement of the type described, the throttle position sensor is not effective to indicate operator demand during the range of movement when the throttle valve is maintained in a partially opened position and the manual throttle control is moved from its idle position to the position where the lost motion in the connection to the throttle valve is taken up, commonly referred to as the "pick-up position."

Thus, it is necessary to provide an additional sensor which is responsive to the position of the operator controlled element in order to provide the control strategy during at least this range of movement. Of course, the actual throttle position sensor can be dispensed with but this is not necessarily a desirable alternative.

The reason why it is useful to employ the throttle position sensor is that the interconnection between the manual operator and the throttle valve is subject to wear and other factors which can cause the position of the operator control may not be truly indicative of the actual operator demand.

This circumstance is not noticed by the operator because he merely moves the operator controlled element to the position to achieve the engine running condition that he desires. In other words, the operator himself compensates for this wear or change in condition. However, the system has no way of doing this.

It is, therefore, a principal object of this invention to provide an improved control mechanism and strategy for an internal combustion engine of the type wherein the throttle valve is held in a partially opened position at speeds below a predetermined speed and greater than idle speed.

It is a further object of this invention to provide an improved control system and control strategy that automatically compensates for wear or change in condition in the throttle valve actuating system.

In marine applications, there is frequently utilized a type of control that is referred to as a "single lever control". These single lever controls operate through a first range from a neutral position wherein the engine speed may be held relatively constant but the transmission is shifted from either neutral to forward or reverse depending upon the direction of movement of the single lever control. After the shift has been completed, then further movement of the single lever control is effective to open the throttle valve of the engine and increase the speed above the speed which existed at the time the shift was completed. Hence, these systems further add to the linkage and thus may be more subject to wear of other like changes in condition than other controls that employ separate throttle and shift control mechanisms.

It is, therefore, a still further object of this invention to provide an improved control arrangement for an internal combustion engine and transmission system embodying a single lever control.

SUMMARY OF THE INVENTION

A first feature of this invention is adapted to be embodied in an engine control system for an internal combustion engine having at least one combustion chamber. An induction system supplies at least an air charge to the combustion chamber for engine operation. A throttle valve is positioned in the induction passage for controlling the air flow through the induction passage to the combustion chamber. A manually operated throttle control is provided for operator control of the engine. This manually operated throttle control is operatively connected to the throttle valve for controlling the position of the throttle valve. The operative connection includes a lost motion connection. The throttle valve is held in a substantially partially opened condition when the manual throttle actuator is in a position less than a predetermined position between its idle position and its wide open throttle position. Means are provided for controlling the speed of the engine by controlling a system other than the throttle valve when the manual throttle actuator has moved between its idle position and this partially opened position. A sensor is provided for sensing the position of the throttle valve. Means are provided for determining the actual degree of movement of the throttle actuator control from its idle position to the predetermined position when the throttle valve begins to open and the control system is adjusted to compensate for variations in the degree of movement of the operator throttle control from its idle position to the position where the throttle valve actually begins to open so as to compensate for wear or changes in condition in the system.

In accordance with another feature of the invention, a position responsive switch is incorporated in the throttle valve arrangement which indicates when the lost motion is taken up.

DETAILED DESCRIPTION OF THE PREFERRED EMBODIMENTS OF THE INVENTION

Figure 1:
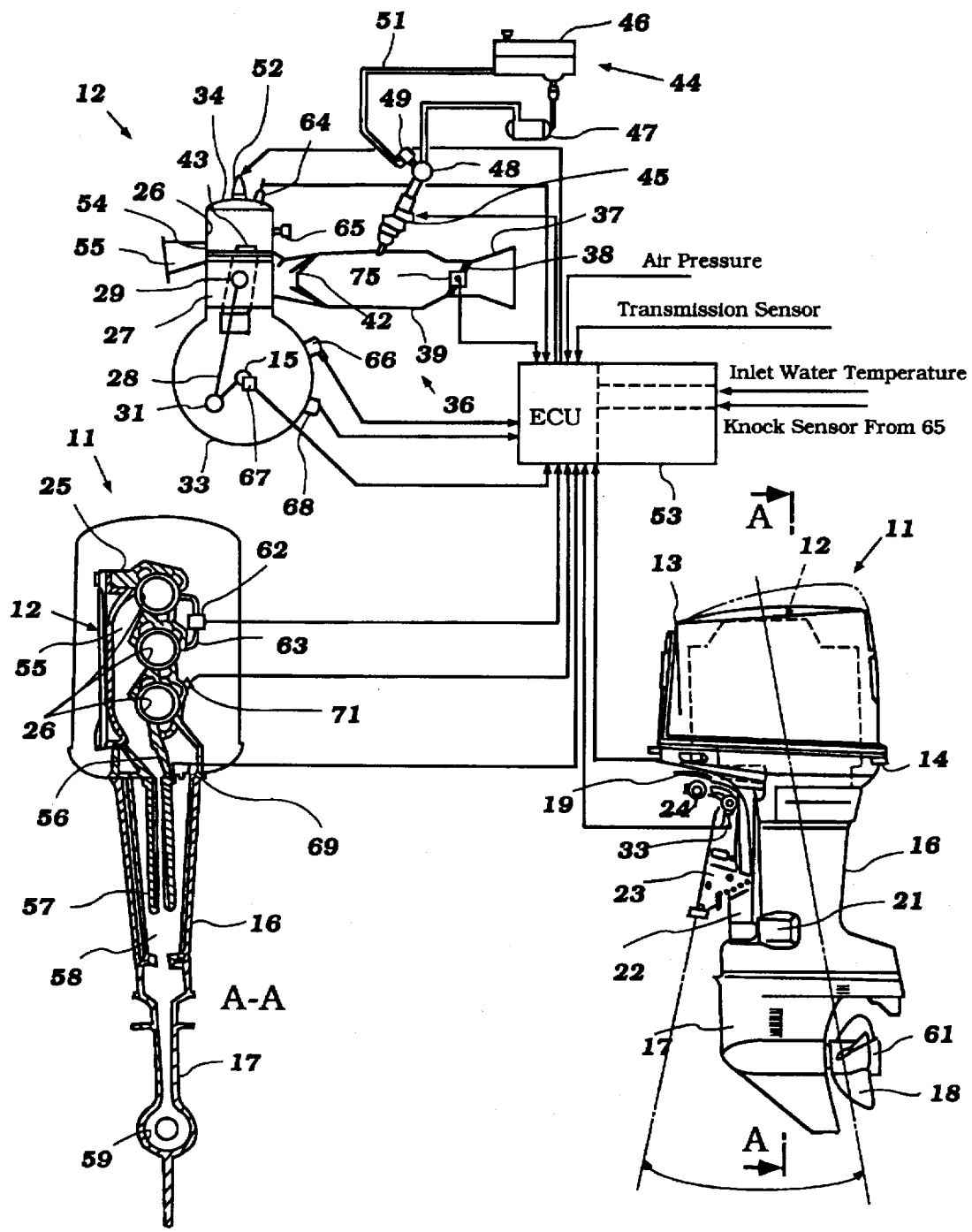
FIG. 1 is a composite view showing, in clockwise direction beginning at the lower right hand portion thereof, a side elevational view of an outboard motor constructed and operated in accordance with an embodiment of the invention, a rear elevational view thereof with a portion broken away along the line A—A and shown in section, and a partially schematic cross-sectional view taken along a horizontal plane through one cylinder of the engine.

Referring now in detail to the drawings and initially to FIG. 1, an outboard motor constructed in accordance with an embodiment of the invention is identified generally by the reference numeral 11. The invention is described in conjunction with an outboard motor because the invention deals with an internal combustion engine and control system therefor. Therefore, an outboard motor is a typical application in which an engine constructed in accordance with the invention may be utilized.

In addition, certain features of the invention deal particularly with two-cycle crankcase compression engines. That type of engine frequently is employed in conjunction with outboard motors because of its compact nature and relative simplicity. This is another reason why the outboard motor application is one in which the invention may find utility.

The outboard motor 11 is comprised of a power head that consists of a powering internal combustion engine, indicated generally by the reference numeral 12 and a surrounding protective cowling comprised of a main cowling portion 13 that is detachably connected to a tray portion 14.

As is typical with outboard motor practice, the engine 12 is supported within the power head so that its output shaft, a crankshaft indicated by the reference numeral 15 in the upper view of this figure, rotates about a vertically-extending axis. This crankshaft 15 is rotatably coupled to a drive shaft (not shown) that depends into and is journaled within a drive shaft housing 16. The tray 14 encircles the upper portion of the drive shaft housing 16.

The drive shaft continues on into a lower unit 17 where it can selectively be coupled to a propeller 18 for driving the propeller 18 in selected forward or reverse direction so as to so propel an associated watercraft. A conventional forward reverse bevel gear transmission is provided for this purpose.

A steering shaft (not shown) having a tiller 19 affixed to its upper end is affixed in a suitable manner, by means which include a lower bracket assembly 21, to the drive shaft housing 16. This steering shaft is journaled within a swivel bracket 22 for steering of the outboard motor 11 about a vertically-extending axis defined by the steering shaft.

The swivel bracket 22 is, in turn, connected to a clamping bracket 23 by means of a trim pin 24. This pivotal connection permits tilt and trim motion of the outboard motor 11 relative to the associated transom of the powered water craft. The trim adjustment through the angle β permits adjustment of the angle of the attack of the propeller 18 to obtain optimum propulsion efficiency. In addition, beyond the range defined by the angle β, the outboard motor 11 may be tilted up to and out of the water position for trailering and other purposes, as is well known in this art.

The construction of the outboard motor 11 as thus far described may be considered to be conventional and for that reason, further details of this construction are not illustrated nor are they believed necessary to permit those skilled in the art to practice the invention.

Continuing to refer to FIG. 1 but now referring primarily the lower left hand portion of this Figure and the upper portion, the engine 12 is, in the illustrated embodiment, of the three-cylinder in-line type. To this end, the engine 12 is provided with a cylinder block 25 in which three horizontally extending, parallel cylinder bores 26 are formed. Although the invention is described in conjunction with a three-cylinder in-line engine, it will be readily apparent to those skilled in the art how the invention may be utilized with engines having various cylinder numbers and cylinder configurations. In addition, certain facets of the invention may also be employed with non-reciprocating engines.

Pistons shown schematically at 27 in FIG. 1 are connected to connecting rods 28 by means of piston pins 29. The lower or big ends of the connecting rods 28 are journaled on respective throws 31 of the crankshaft 15, as is well known in this art.

The crankshaft 15 is rotatably journaled within a crankcase chamber 32 formed at the lower ends of the cylinder bores 26. The crankcase chambers 32 are formed by the skirt of the cylinder block 25 and a crankcase member 33 that is affixed to the cylinder block 25 in any well known manner. As has been noted, the engine 12 operates on a two-cycle crankcase compression principal. As is typical with such engines, the crankcase chambers 32 associated with each of the cylinder bores 26 are sealed relative to each other in any suitable manner.

The ends of the cylinder bores 26 opposite the crankcase chambers 32 are closed by means of a cylinder head assembly 34 that is affixed to the cylinder block 25 in any known manner. The cylinder head 34 has recesses which cooperate with the cylinder bores 26 and the heads of the pistons 27 to form combustion chambers, indicated generally by the reference numeral 35. These combustion chambers 35 have a volume which varies cyclically during the reciprocation of the pistons 27 as is well known in this art.

An intake charge is delivered to the crankcase chambers 32 for compression therein by means of a charge forming and induction system, indicated generally by the reference numeral 36. The charge forming and induction system 36 includes an air inlet device 37 that is disposed within the protective cowling of the power head and which draws air therefrom. This air is admitted to the interior of the protective cowling by one or more air inlets formed primarily in the main cowling member 13.

A throttle valve 38 is positioned in the induction passage or intake manifold 39 that connects the air inlet device 37 to respective intake ports 41 formed in the cylinder block 25 and which communicate with the crankcase chambers 32 in a well known manner.

Reed type check valves 42 are provided in each of the intake ports 41 so as to permit a charge to flow into the crankcase chambers 32 when the pistons 27 are moving upwardly in the cylinder bores 26. On the other hand, when the pistons 27 move downwardly this charge is compressed in the crankcase chambers 32 and is transferred to the combustion chambers 35 through one or more scavenge passages 43.

Fuel is supplied to the air charge admitted as thus far described by a charge forming system, indicated generally by the reference numeral 44. This charge forming system 44 includes one or more fuel injectors 45 that spray into each of the intake passages 39. Preferably, the fuel injectors 45 are of the electrically operated type having electrically actuated solenoid valve that controls the admission or spraying of fuel into the intake passages 39 upstream of the check valves 42.

Fuel is supplied to the fuel injectors from a remotely positioned fuel tank 46. The fuel tank 46 is, most normally, positioned within the hull of the associated watercraft as is well known in this art. The fuel is drawn through a supply conduit by a pumping system including a high pressure pump 47 which discharges into a main fuel rail 48. The fuel rail 48 supplies fuel to each of the fuel injectors 45 in a known manner.

A pressure control valve 49 is provided in or adjacent the fuel rail 48 and controls the maximum pressure in the fuel rail 48 by dumping excess fuel back to the fuel tank 46 or some other place in the system upstream of the fuel rail 48 through a return conduit 51. The fuel that is mixed with the air in the induction and charge forming system 36 as thus far described will be mixed and delivered to the combustion chambers 35 through the same path already described.

Spark plugs 52 are mounted in the cylinder head 34 and have their gaps extending into the respective combustion chambers 35. These sparks plug 52 are fired by a suitable ignition circuit (not shown) which is triggered by an ECU 53.

When the spark plugs 52 fire, the charge in the combustion chambers 35 will ignite, burn and expand. This expanding charge drives the pistons 27 downwardly to drive the crankshaft 15 in a well known manner. The exhaust gases are then discharged through one or more exhaust ports 54 which open through the sides of the cylinder block bores 26 and communicate with an exhaust manifold 55 as shown schematically in the upper view of FIG. 1 and in more detail in the lower left side view of this figure.

Referring now primarily to the lower left hand side view of FIG. 1, the exhaust manifold 55 terminates in a downwardly facing exhaust discharge passage 56 that is formed in an exhaust guide plate upon which the engine 12 is mounted. This exhaust guide plate delivers gases to an exhaust pipe 57 that depends into the drive shaft housing 16.

The drive shaft housing 16 defines an expansion chamber 58 in which the exhaust pipe 57 terminates. From the expansion chamber 58, the exhaust gases are discharged to the atmosphere in any suitable manner such as by means of a underwater exhaust gas discharge 59 which discharges through the hub 61 of the propeller 18 in a manner well known in this art. At lower speeds when the propeller 18 is more deeply submerged, the exhaust gases may exit through and above the water atmospheric exhaust gas discharge (not shown) as also is well known in this art.

In addition to controlling the timing of the firing of the spark plugs 52, the ECU 53 controls the timing and duration of fuel injection of the fuel injector 45 and may control other engine functions. For this purpose, there are provided a number of engine and ambient condition sensors. In addition, there is provided a feedback control system for controlling the fuel air ratio in response to the measurement of the actual fuel air ratio by a combustion condition sensor such as an oxygen ($O_2$) sensor 62 which is positioned in a passageway 63 that interconnects two of the cylinder bores 26 at a point adjacent the point where the exhaust passages 54 are located. This type of feedback control system and placement for the sensor 62 may be of the type described in the application entitled "Sensor Arrangement For Engine Control System", Ser. No. 08/435,715, filed May 5, 1995, in the name of Masahiko Katoh and assigned to the assignee hereof. That disclosure is incorporated herein by reference.

In addition to the $O_2$ sensor, other sensors of engine and ambient conditions are provided. These include an in-cylinder pressure sensor 64 and knock sensor 65 that are mounted in the cylinder head 34 and cylinder block 25, respectively. The outputs from these sensors are transmitted to the ECU 53.

Air flow to the engine may be measured in any of a variety of fashions and this may be done by sensing the pressure in the crankcase chamber 32 by means of a pressure sensor 66. As is known, actual intake air flow can be accurately measured by the measuring the pressure in the crankcase chamber 32 at a specific crank angle. A crank angle position sensor 67 is, therefore, associated with the crankshaft 15 so as to output a signal to the ECU 53 that can be utilized to calculate intake air flow and, accordingly, the necessary fuel amount so as to maintain the desired fuel air ratio. The crank angle sensor 67 may be also used as a means for measuring engine speed, as is well known in this to art.

Intake air temperature is measured by a crankcase temperature sensor 68 which is also positioned in the crankcase 33 and senses the temperature in the crankcase chambers 32.

Exhaust gas back pressure is measured by a back pressure sensor 69 that is mounted in a position to sense the pressure in the expansion chamber 58 within the drive shaft housing 16.

Engine temperature is sensed by an engine temperature sensor 71 that is mounted in the cylinder block 25 and which extends into its cooling jacket. In this regard, it should be noted that the engine 12 is, as is typical with outboard motor practice, cooled by drawing water from the body of the water in which the outboard motor 11 operates. This water is circulated through the engine 12 and specifically its cooling jackets and then is returned to the body of water in any suitable return fashion.

The temperature of the intake water drawn into the engine cooling jacket is also sensed by a temperature sensor which is not illustrated but which is indicated by an arrow and legend in FIG. 1. In addition other ambient conditions such as atmospheric air pressure are transmitted to the ECU 53 by appropriate sensors and as indicated by the arrows in FIG. 1.

Figure 2:
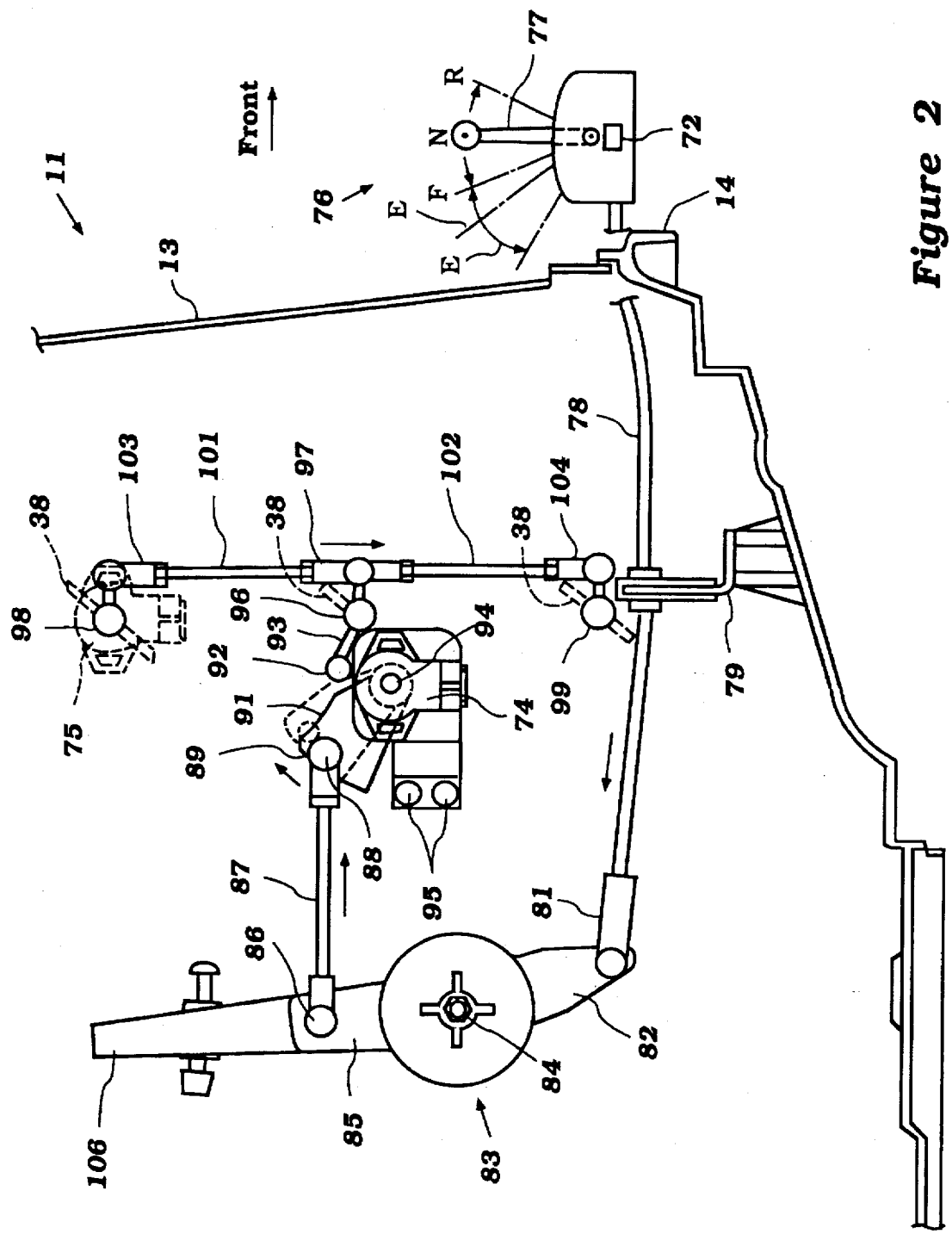
FIG. 2 is an enlarged side elevational view of the power head with the protective cowling broken away and showing the spark advance and throttle control mechanism constructed in accordance with a first embodiment of the invention.

Furthermore, the condition of the transmission which, as has been noted, couples the drive shaft to the propeller 18 is determined by a transmission sensor also indicated by the arrow in this figure and by the reference numeral 72 in FIG. 2. This sensor basically indicates the condition of the transmission as to whether it is in a neutral or in a driving condition.

In addition, a trim angle sensor 73 is provided adjacent the trim pin 24 so as to provide a signal indicative of the angle $\beta$.

In addition to those sensors which appear in FIG. 1, as will become apparent by reference to FIG. 2, there is also provided a sensor, indicated in FIG. 2 by the reference numeral 74 which senses the position of the operator demand or the speed control element that is operated by the operator. This indicates the operator demand for engine power output.

Again referring to FIG. 1, there is provided a throttle angle position sensor 75 that outputs a signal indicative of the position of the throttle valve 38. As will now be described by reference to FIG. 2, the condition of the operator controlled element may be different from that of the throttle valve 38 and hence the outputs of the sensors 74 and 75 are not directly related under some running conditions, as will become apparent.

Turning now specifically to this situation, the mechanism by which the throttle valve 38 and the timing of firing of the spark plug 52 is controlled will be described by particular reference to FIGS. 2 through 5 with the initial discussion centering on FIG. 2. FIG. 2 is an enlarged view showing the forward portion of the cowling and specifically the area where the mechanism for controlling the position of the throttle valves 38 and the position of a pulser coil associated with the ignition system is located.

A single lever control mechanism of any known type is positioned in the hull of the associated watercraft in proximity to the operators position. As is well known in this art the single lever control mechanism 76 operates a transmission control, for example through a first bowden wire mechanism, (not shown) during a first range of movement of a control lever 77 for shifting between neutral and forward or reverse drive.

As is typical with such single lever controls, continued movement of the control lever 77 after the shift to drive is accomplished causes an increase in engine speed. This is accomplished through a further bowden wire actuator 78 that extends from the remotely positioned single lever control mechanism 76 through the tray 12 and specifically an opening formed therein.

The trailing end of the protective sheath of the bowden wire actuator 78 is supported in a supporting bracket 79 via an elastic grommet. The wire actuator 78 has a ferule 81 at its end which is connected to the control lever 82 of a throttle and spark timing control mechanism, indicated generally by the reference numeral 83. The lever 82 is rotatably journaled on a pivot pin 84 that is affixed to the side of the cylinder block 25 of the engine 12 in any appropriate manner.

The control lever 82 has an upper portion 85 that is pivotally connected by a connector 86 to one end of an actuating link 87. The other end of the actuating link 87 is connected by a connector 88 to a manual throttle actuator or cam 89. The manual throttle actuator 89 has an arcuate cam surface 91 which is adapted to engage a follower portion 92 of a throttle control lever 93. The manual throttle actuator 89 is journaled upon a pivot pin 94 which forms a part of the speed control element position sensor 74, the actual speed control element comprising the actuator 89. The sensor 74 is mounted to the side of the engine by a pair of fasteners 95.

The throttle control lever 93 is affixed to a throttle valve shaft 96 of the throttle valve 38 of the center-most intake manifold 39 of the engine 12. A linkage assembly comprised of a T shaped member 97 interconnects the throttle valve shaft 96 with throttle valve shafts 98 and 99 of the upper and lower throttle valves 38 associated with the upper-most and lower-most cylinders of the engine 12. This linkage assembly includes a pair of links 101 and 102 which are connected to the T-shaped member 97 at one end and by couplings 103 and 104 to the throttle valve shafts 98 and 99, respectively.

As also seen in this figure, the throttle valve position sensor 75 is associated with the upper-most throttle valve 38. However, this mechanism may be associated with any one of the throttle valve shafts 96, 98 or 99 as will be made apparent form the description below.

Movement of the lever 77 causes the bowden wire 78 to displace, such displacement being to the left when the lever 77 is moved counterclockwise. This causes the spark control assembly 83 to pivot about the pin 84 which, in turn, moves the link 87 to the right. This induces a clockwise rotation of the manual throttle actuator 89 about the pin 94 that is detected by the operator control sensor 74 which signals the ECU 53. Continued rotation by the manual throttle actuator 89 eventually results in its cam surface 91 contacting the follower 92. Further manual throttle actuator movement beyond this displaces the follower 92 which causes the throttle control lever 93 to pivot about and rotate the valve shaft 96 which, in turn, opens the throttle valve 38.

The rotation of the valve shaft 96 causes the T-shaped member 97 and the links 101 and 102 to translate downwards. This rotates the throttle valve shafts 98 and 99 clockwise an angular amount that is identical to the angular rotation of the shaft 96. This rotation is detected by a throttle valve position sensor 75 that is in association with the shaft 98 and signals the ECU 53. Thus, it is apparent that all three throttle valves 38 are operated upon in equal magnitude by the engine control linkage and therefore open the same amount. It is also apparent that the throttle valve position sensor may be equally associated with any of the throttle valves 38.

The above described motion is monitored by the ECU 53 which receives signals from the operator control sensor 74 and the throttle valve position sensor 75 for a purpose to be described later.

The strategy by which the throttle valves 38 are opened will now be described by particular reference to FIG. 3. It is to be understood, however, that this strategy is generally the same as that described in the aforenoted application Ser. No. 08/299,517, the disclosure of which has been incorporated herein by reference. Therefore, if any details are omitted reference may be had to that application for them.

Basically, a stop mechanism (not shown) is associated with the throttle valves 38 or the actuating linkage mechanism so that at the idle position the throttle valves are opened at an angle α to a plane 105 which would represent the position if the throttle valve 38 was in its fully closed position. This angle α is approximately 10°–15° and thus is in a position which is wider open than necessary to supply the idle air requirements for the engine 12.

Therefore, the engine 12 could be maintained at the desired idle speed by disabling one or more cylinders and/or changing the spark timing in the manner described in that application. In this position and when the manual throttle actuator 89 or as it is sometimes referred to the speed controlling element is in its idle position as shown in the solid line view of FIG. 3, there will be a substantial gap between the cam surface 91 and the follower 92 associated with the throttle valve 38.

Hence, the actuator 89 can and will rotate through an angle which is approximately 10°–15° before its cam surface 91 contacts the follower 92, this point being defined as the pick up point. As the manual throttle actuator 89 moves through this angle the speed or output of the engine is increased primarily by controlling the spark timing and/or the number of cylinders that are fired For example, the speed at idle may be reduced by retarding the spark more than normal to reduce engine speed. As the control element 89 is moved in the speed increasing direction, the spark is advanced, in a manner which will be described, to obtain the desired engine speed.

Figure 3:
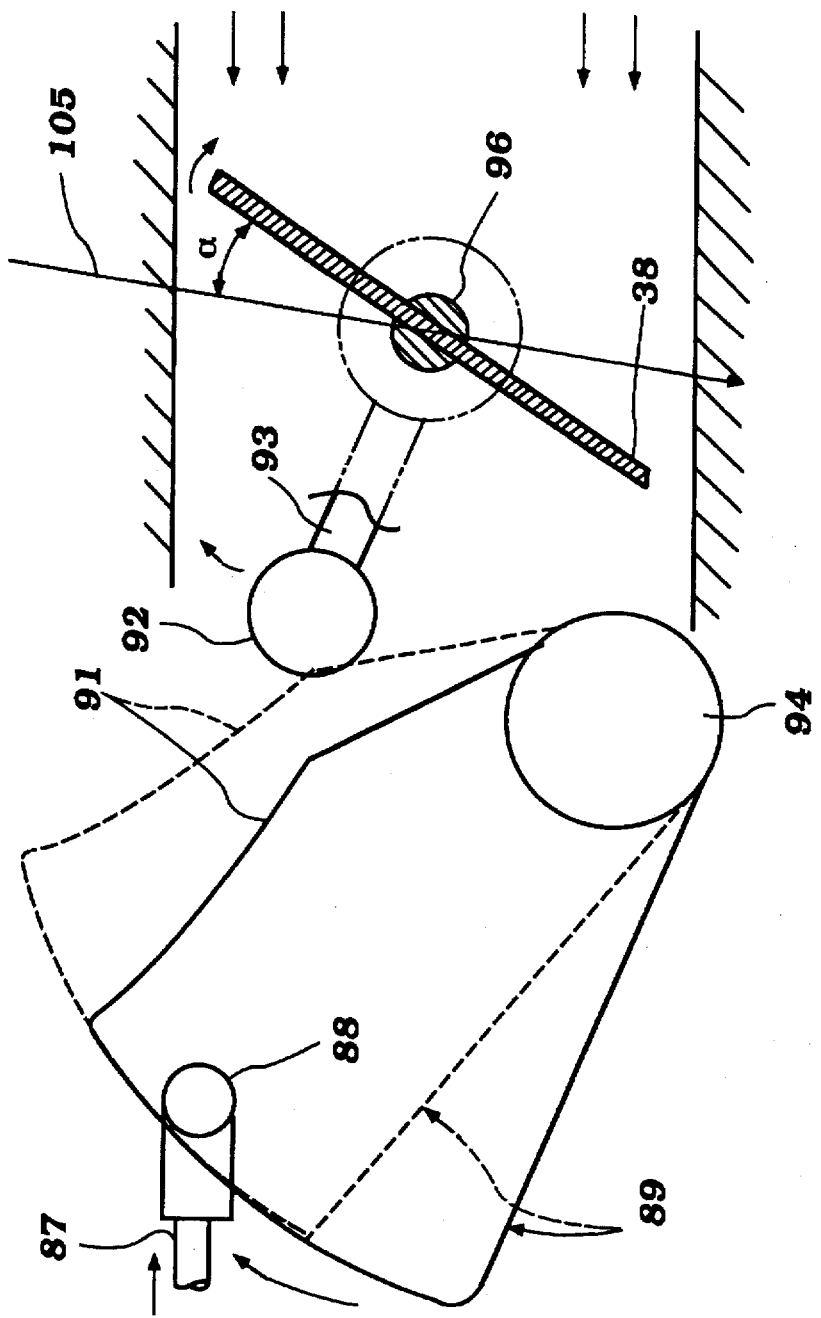
FIG. 3 is an enlarged cross-sectional view showing a portion of the throttle control mechanism so as to explain the operation with the throttle control mechanism with the manual throttle actuator being shown in its idle position in solid lines and in the pick up position in phantom lines.

Thereafter, rotation of the manual throttle actuator 89 causes movement of the throttle valve 38 from its normal idle position as shown in FIG. 3 to its fully opened position. The cam surface 91 is shaped so as to provide the desired degree of relative movement between the manual throttle actuator 89 and the throttle valve 38 under this opening condition.

Referring again to FIG. 2, it will be seen that the engine is also provided with a spark control lever, indicated by the reference numeral 106 which spark control lever is operatively connected to a timing plate (not shown) which is associated with the crankshaft 15 of the engine 12. Normally this timing plate will be positioned at the upper end of the engine 12 and is associated with the flywheel magneto of the engine 12. This timing plate carries a pulser coil and when the flywheel magneto is at a specific angular position, an output pulse will be generated by this pulser coil which is utilized as a signal by the ECU 53 so as to determine the spark timing.

Figure 4:
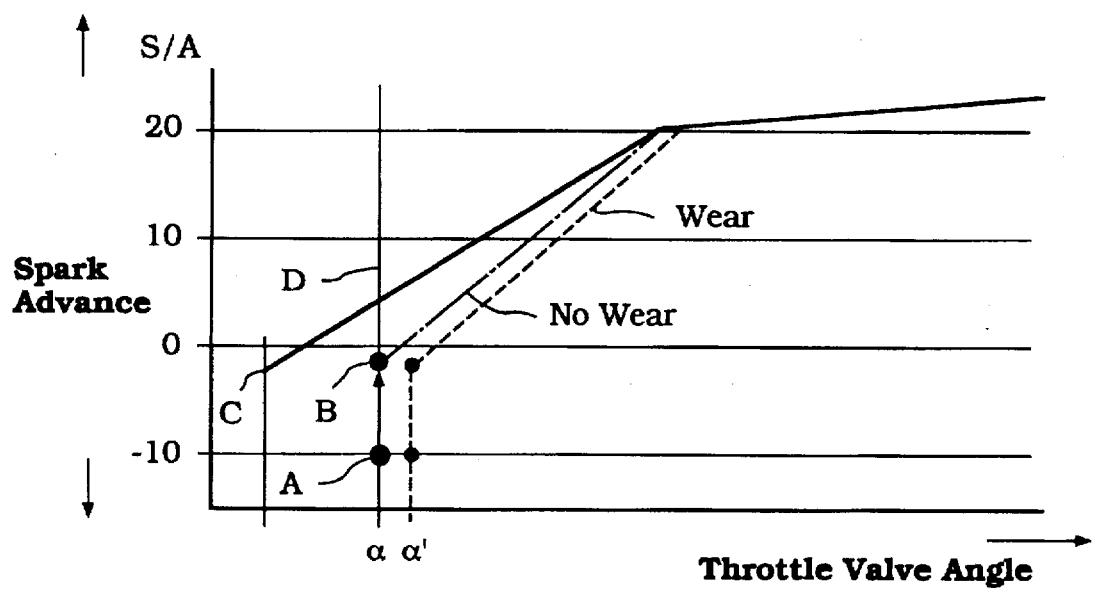
FIG. 4 is a graphical view showing the spark advance timing in relation to throttle valve position in accordance with a prior art type of construction in solid lines and according to the present invention in the phantom lines with the correction system being explained by the dot dash view showing the condition without changes in condition and after changes in condition have been compensated for and the non-compensated condition being shown by the broken line view.

The strategy by which the invention controls the spark advance and accordingly the speed will now be described by reference to FIGS. 4 and 5. In FIG. 4, a conventional spark advance curve is shown in solid line. As may be seen, the initial spark timing is set when the operator control is in its idle condition at the point C at approximately 2°–3° before top dead center. This spark advance continues to increase along an inclined ramp in a generally linear fashion as the throttle control 93 and throttle valve 38 move together in their opening direction. As known, with conventional engines these elements open simultaneously for their full range.

With the control system utilized with the invention, the throttle valve is held in its substantially opened position when the control cam 89 moves from the point A (idle position) to the point B (pick up position). During this range of movement, engine speed is increased by advancing the spark advance from about 10° after top dead center (TDC) to about 1° after top dead center. When at the pick up point when the cam surface 91 engages the follower 92 the actual spark timing will be advanced in a linear fashion as shown in FIG. 4. As with conventional spark advance curves, the timing continues to increase in a linear fashion until some point where either the timing is held fixed at approximately 20° before top dead center or it may continue to increase but at a much slower rate as shown in this figure.

In this invention, the spark timing is set much later than conventional Such as 10° after top dead center at the idle position A of the speed controlling element or throttle cam 89 to effect a reduction in speed and compensate for the more opened than normal throttle position. From the idle position to the pick up point B the spark is gradually advanced from 10° after top dead center to approximately 2° before top dead center, the conventional idle position. Hence, the spark timing is retarded from that of conventional and thus the engine speed control may be maintained in this fashion rather than by discontinuing the number of cylinders that are fired as with the prior art type of construction described in the aforenoted copending application.

Once the pick up point B is reached, then the spark is continued to advance but at a more rapid rate but beginning at a lower value than with a conventional engine. Thus, engine speed control is obtained better than with the prior art type of construction and without the necessity of discontinuing the firing of certain cylinders. However, if desired, these features may be utilized in conjunction with each other.

In FIGS. 2 and 3 it is seen that the cam or manual throttle actuator 89 is utilized as a lost motion connector and will rotate through an angle of approximately 10 to 15 degrees before its surface 91 contacts the follower 92 at the pick up point. A problem occurs, however, in that over time the cam surface 91 wears down due to repeated sliding contact with the follower 92. This causes the pick up point to be delayed and results in a dead band condition wherein continued movement of the cam 89 will not result in a change in spark timing since after the pickup point spark timing is controlled by throttle valve position. Other changes in condition than wear may cause a similar effect.

Figure 5:
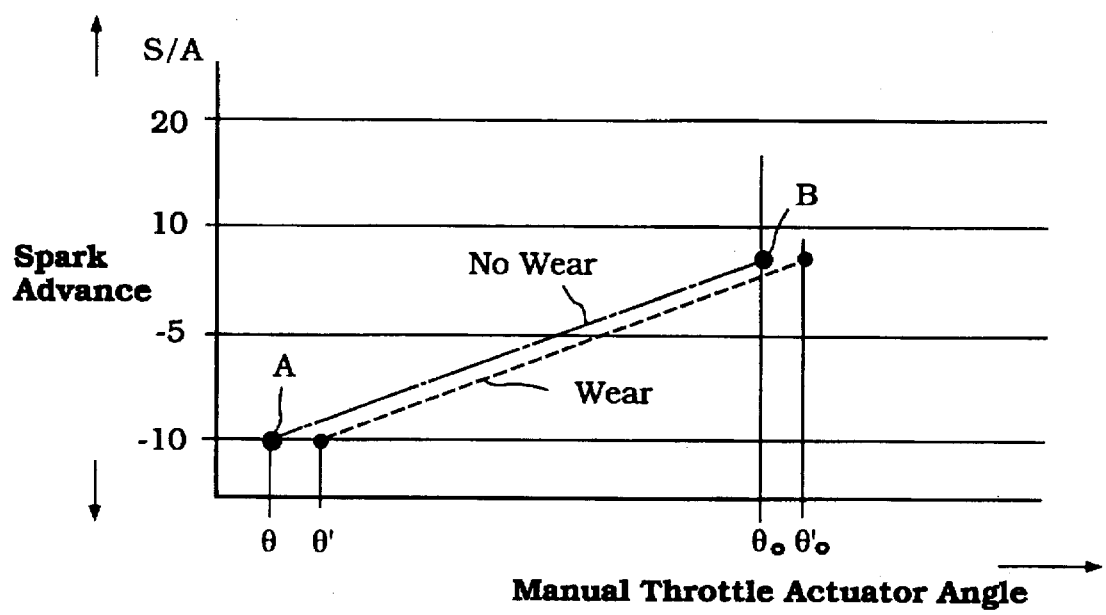
FIG. 5 is a graphical view showing the spark advance timing in relation to the manual throttle actuator position with and without compensation in broken and dot dash lines, respectively.

This may be seen in FIGS. 4 and 5. Thus there is less than ideal spark advance angle, and thus a dead band in engine speed, for the engine 12 when operating with the manual throttle actuator 89 disposed somewhere between the wear-free and wear-induced pick up positions.

An embodiment of this invention eliminates this adverse situation by employing means to detect the amount of wear or change in condition on the cam surface 91 and compensate for it using control systems to be described with reference to FIGS. 2 through 11.

In FIG. 2 it is seen that the operator control sensor 74 and the throttle valve position sensor 75 signal the ECU 53. These signals are used by the ECU 53 to determine if any wear has occurred on the cam surface 91 of the manual throttle actuator 89. This wear or change in condition is accounted for by a control system that is shown schematically in FIG. 8.

Both the operator control sensor 74 and the throttle valve position sensor 75 signal the ECU 53. The operator control sensor 74 sends a signal to the ECU 53 that is indicative of the position of the manual throttle actuator 89 while the throttle valve position sensor 75 will signal the ECU 53 when the throttle valve 38 begins to rotate, this rotation occurring at the pick up position where the cam surface 91 contacts the follower 96.

The manual throttle actuator angle at the pick up position is then compared to the known manual throttle actuator angle at the pick up position for a wear-free linkage by the ECU 53 to determine if the cam surface 91 has worn down somewhat or if other factors cause a similar effect and, if so, by how much. Based on this, the ECU 53 calculates the degree by which the spark advance angle, shown in FIGS. 4 and 5, needs to be adjusted to compensate for the cam surface wear and actuates the spark plug henceforth in accordance with these calculations. This spark advance adjustment is represented by the rightmost dashed lines of FIGS. 4 and 5 which show the spark advance as a function of the throttle valve angle and manual throttle actuator angle respectively.

Figure 6:
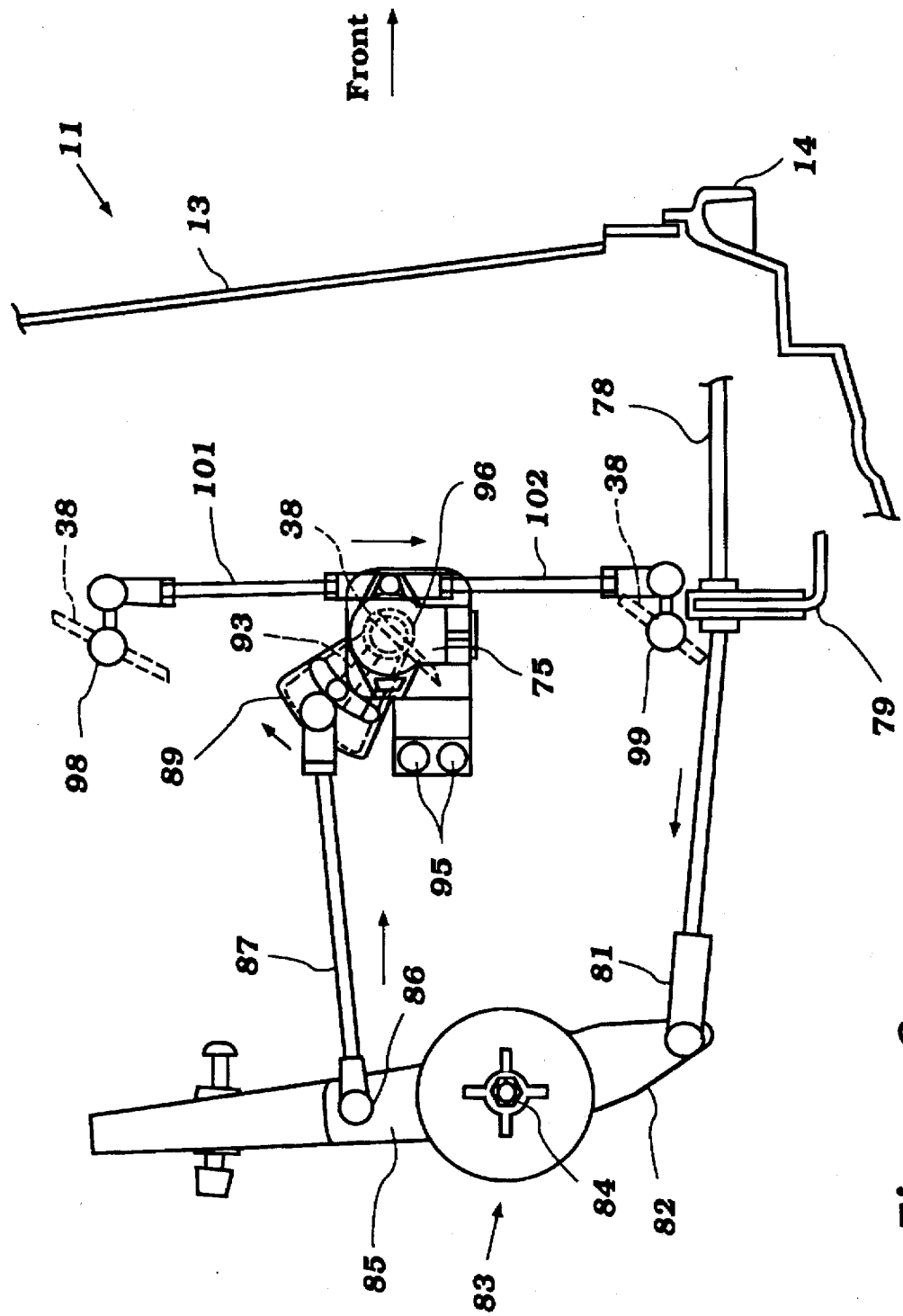
FIG. 6 is a side elevational view, in part similar to FIG. 2 and shows a further embodiment of the invention.
Figure 7:
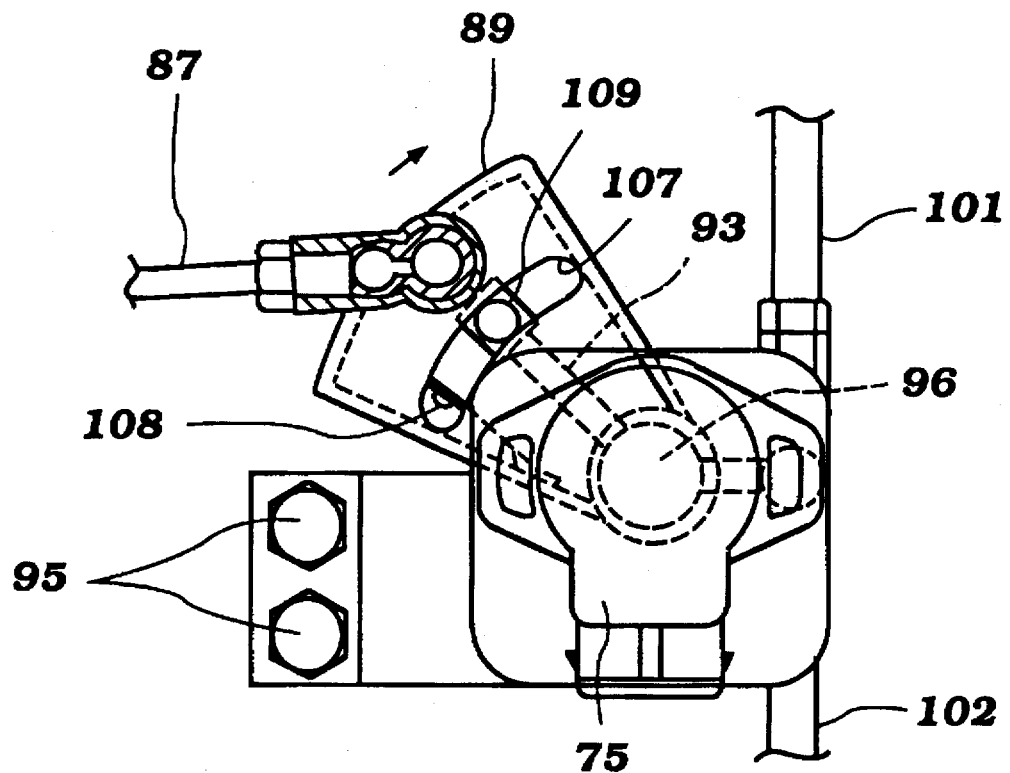
FIG. 7 is an enlarged side elevational view of a portion of the embodiment shown in FIG. 6.

FIGS. 6 and 7 illustrate a further embodiment which describes a more compact assembly that can also be used to calculate the wear or change in condition on the cam surface 91 of the manual throttle actuator 89.

A position detector is provided to give an indication of when the true pick up point is reached. To achieve this, the throttle control bar 93 is affixed to the throttle valve shaft 96 and extends upwardly through a lost motion slot 107 formed in the manual throttle actuator 89. A position detector switch or manual throttle actuator position sensor 108 is positioned at one end of the slot 107 of the manual throttle actuator 89.

Forward motion by the actuator link 87 causes the manual throttle actuator 89 to rotate clockwise. This motion is not communicated to the throttle control bar 93 until the position detector switch sensor 108 contacts the pickup portion 109 of the throttle control bar 93. Hereafter, any further actuator link motion is directly communicated to the throttle control bar 93 and thus to the throttle valve 38.

Figure 8:
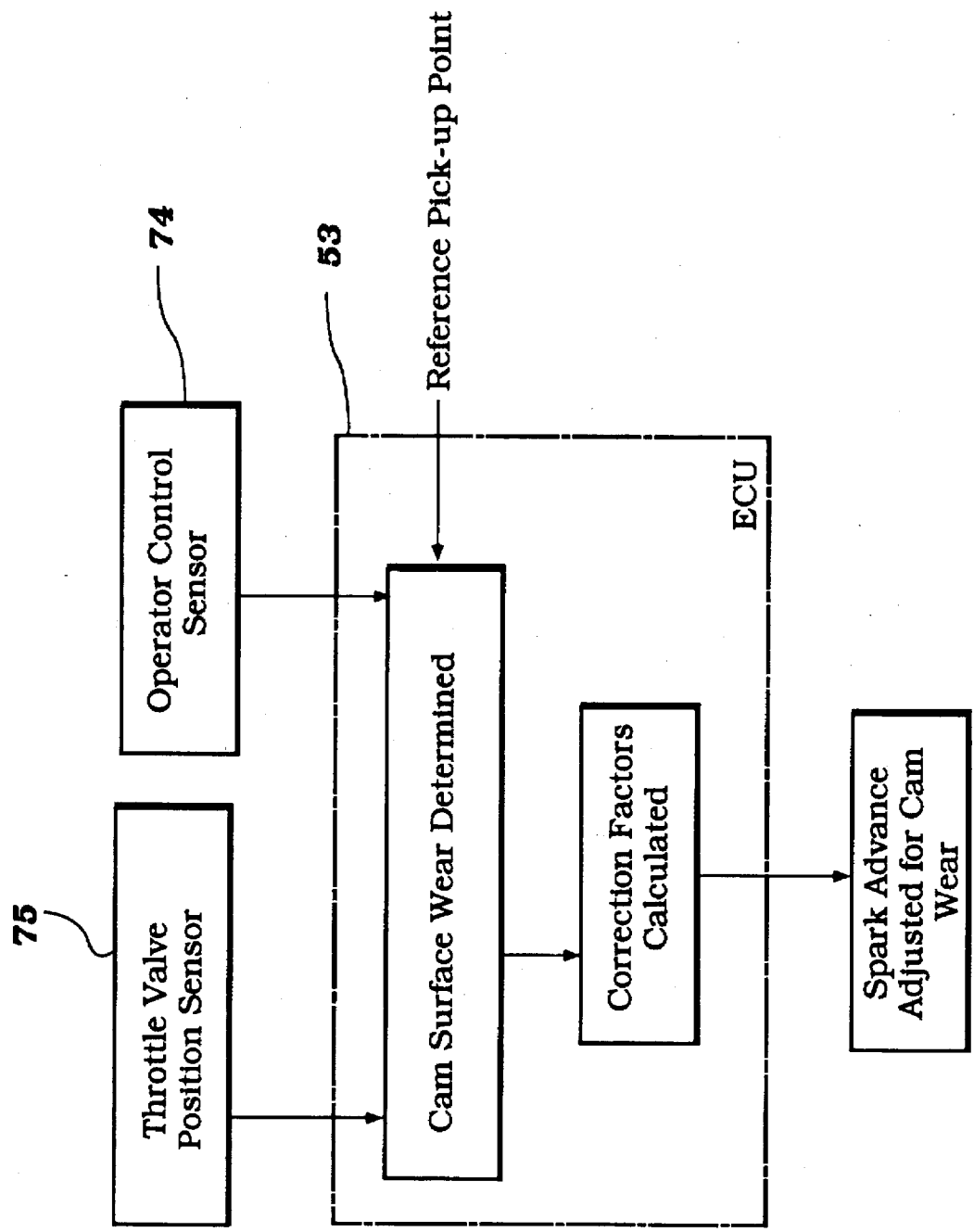
FIG. 8 is a graphical view showing the interrelation of the elements that provide the compensation for an embodiment of the invention.

The wear or change in condition in this system is accounted for by a control system that differs from that shown in FIG. 8 only in that the operator control sensor 74 has been replaced by the manual throttle actuator position sensor or position detector switch 108. Both the manual throttle actuator position sensor 108 and the throttle valve position sensor 75 signal the ECU 53. The manual throttle actuator position sensor 108 sends a signal to the ECU 53 when it contacts the pick up portion 109 of the throttle control bar 93 while the throttle valve position sensor 75 will send a signal to the ECU 53 that is indicative of the throttle valve angle associated with the manual throttle actuator angle at the pick up position where it contacts the pick up portion 109 of the throttle control bar 93.

The manual throttle actuator angle at the pick up position is then compared to the known manual throttle actuator angle at the pick up position for a wear-free linkage by the ECU 53 to determine if the cam surface 91 has worn down somewhat and, if so, by how much. Based on this, the ECU 53 calculates the degree by which the spark advance angle, shown in FIGS. 4 and 5, needs to be adjusted to compensate for the cam surface wear and actuates the spark plug henceforth in accordance with these calculations.

Thus it is readily apparent that the effects of any wear present in either of the above engine control linkage mechanisms occurring specifically at the cam surface 91 can be detected and compensated for by the ECU 53.

Figure 10:
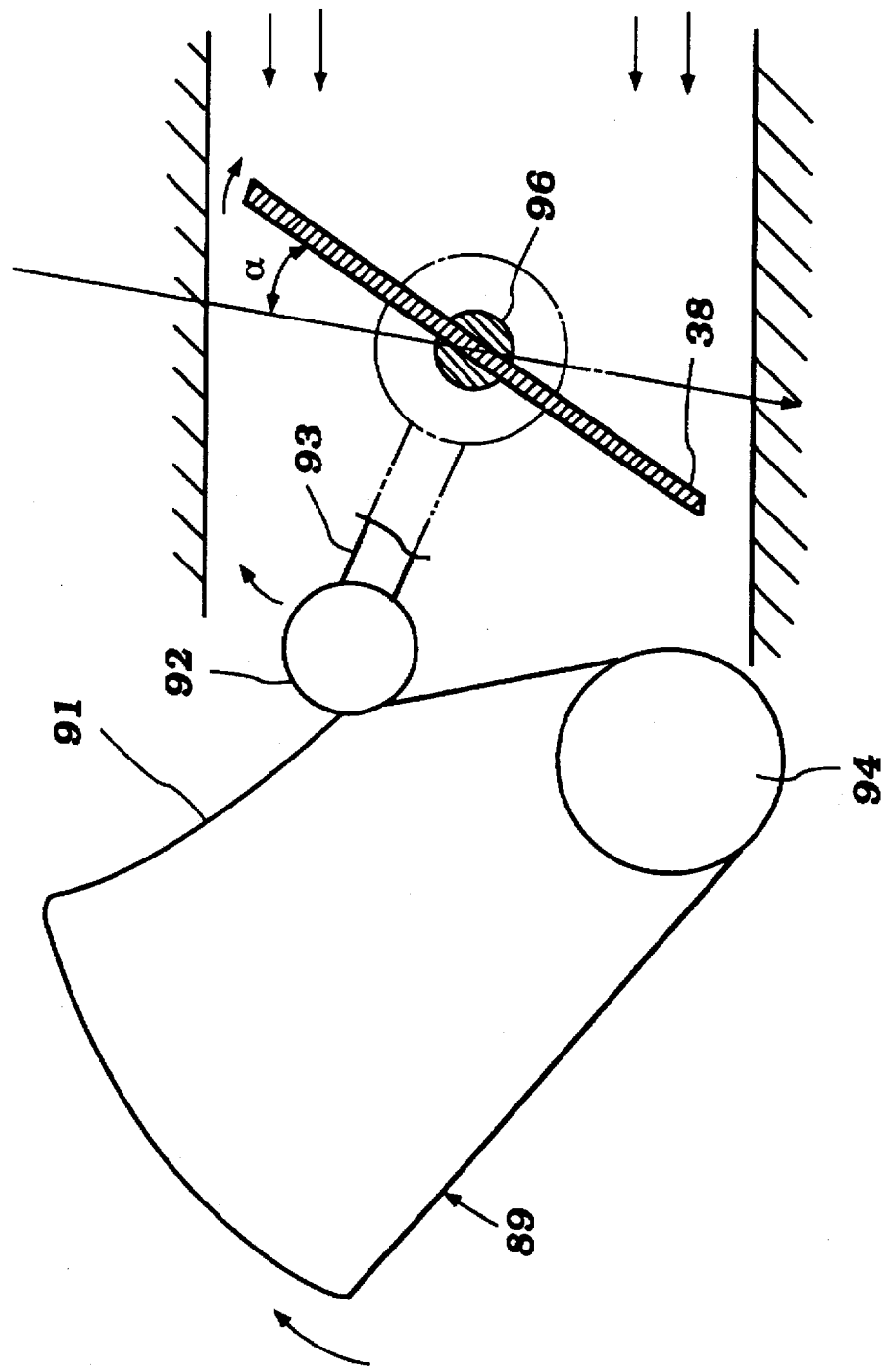
FIG. 10 is a side elevational view, in part similar to FIGS. 2, 6 and 7 and is associated with the embodiment of FIG. 9.

Referring again to FIG. 2 it is seen that the single lever control 76 is employed as the control means for the engine control linkage. These lever controls are configured such that in a first range of motion between the positions "F" and "R" (forward and reverse gear) the engine speed is held relatively constant while the transmission is shifted from neutral, "N", to either forward or reverse. Any further movement of the lever 77 causes the manual throttle actuator 89 to rotate clockwise and the engine speed to increase slightly. In other words, a second lost motion connection is disposed in the single lever control 76 such that when the lever 77 is moved from "N" to "F" (or "R") the manual actuator 89 is not rotated by this motion, but when the lever 77 is moved past "F" then the manual throttle actuator 89 moves from its idle to its pick up position, as is seen in FIG. 10. And further lever movement is then transmitted to the throttle valve 38.

The possibility exists that wear in the single lever control lost motion connection may delay the shift of the transmission into gear which would result in the transmission engaging when the engine 12 is operating in an off-idle condition. This undesirable situation could ultimately lead to gear or drive shaft failure induced by the shock of a higher engine speed transmission engagement. An embodiment of this invention eliminates this problem by employing means to detect any wear in the single lever control mechanism 76 and compensate for it using a control system to be described with reference to FIGS. 9 and 10. To expedite this the transmission sensor 72 as seen in FIG. 2 and a shift lever position sensor 111 are disposed within the single lever control 76.

Figure 9:
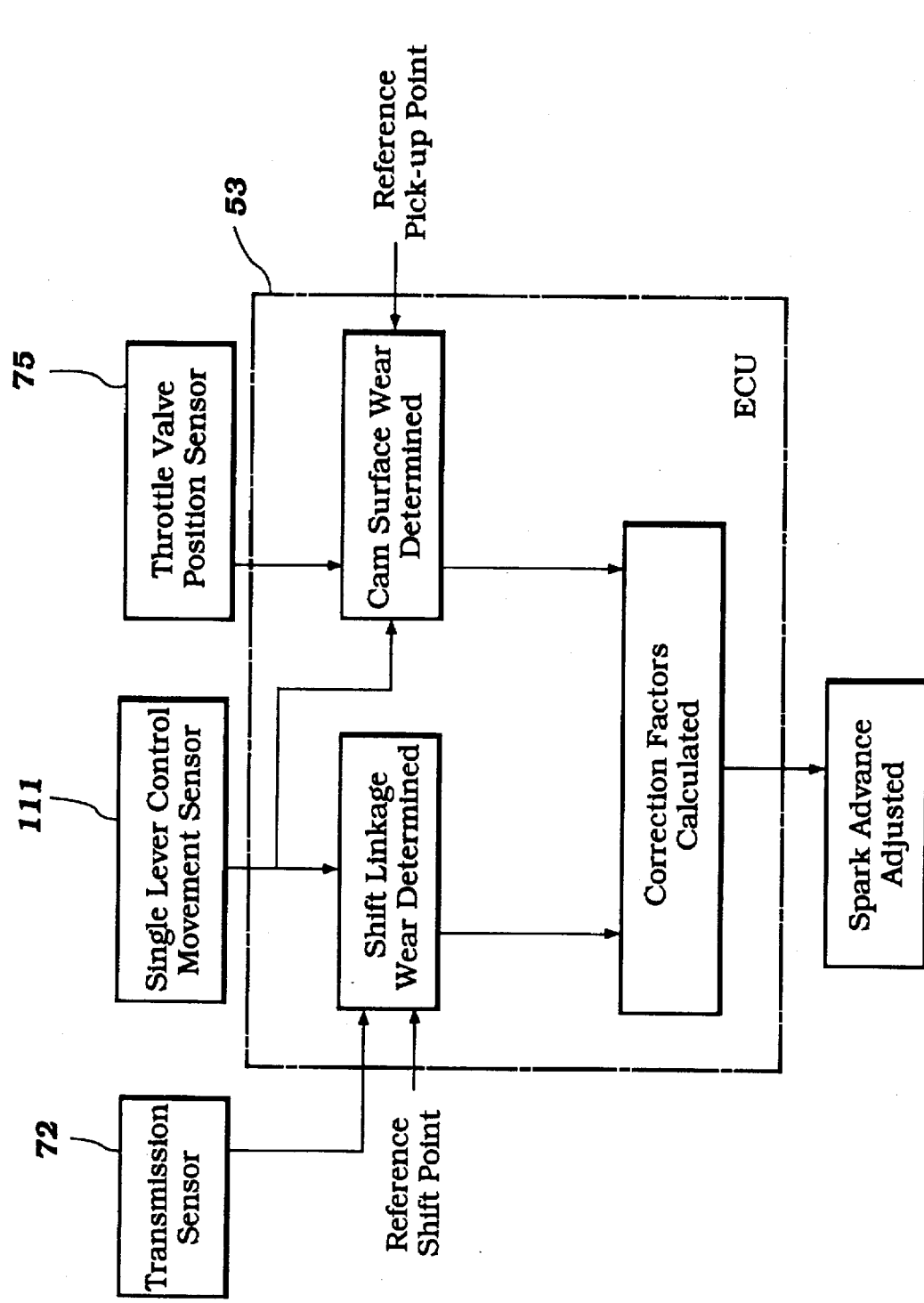
FIG. 9 is a graphical view showing the elements that provide the compensation for a further embodiment of the invention.

The wear or change in condition is the single lever control 76 is compensated for by a control sequence that is shown schematically in FIG. 9. The transmission sensor 72 signals the ECU 53 when the transmission shifts from "N" to either "F" or "R" while at the same time, the shift lever position sensor 111 will send a signal to the ECU 53 that is indicative of the position of the shift lever 77 at the time that the transmission engages. This information is compared to the known position of the shift lever 77 for wear-free transmission engagement. If a difference is present the degree of wear is determined by the ECU 53.

The ECU 53 also determines the degree of wear on the cam surface 91. Signals from the shift lever sensor 111 and throttle valve position sensor 75 are used to determine the position of the shift lever 77 when the throttle valve 38 initially opens, which occurs at the pick up point. This lever position is then compared by the ECU 53 to the known lever position at pick up for a wear-free linkage to determine the wear on the cam surface 91. Thus, the calculated correction factor takes into account the wear in both the single lever control mechanism 76 and the cam surface 91 and the spark advance angle is adjusted to compensate for both.

Figure 11:
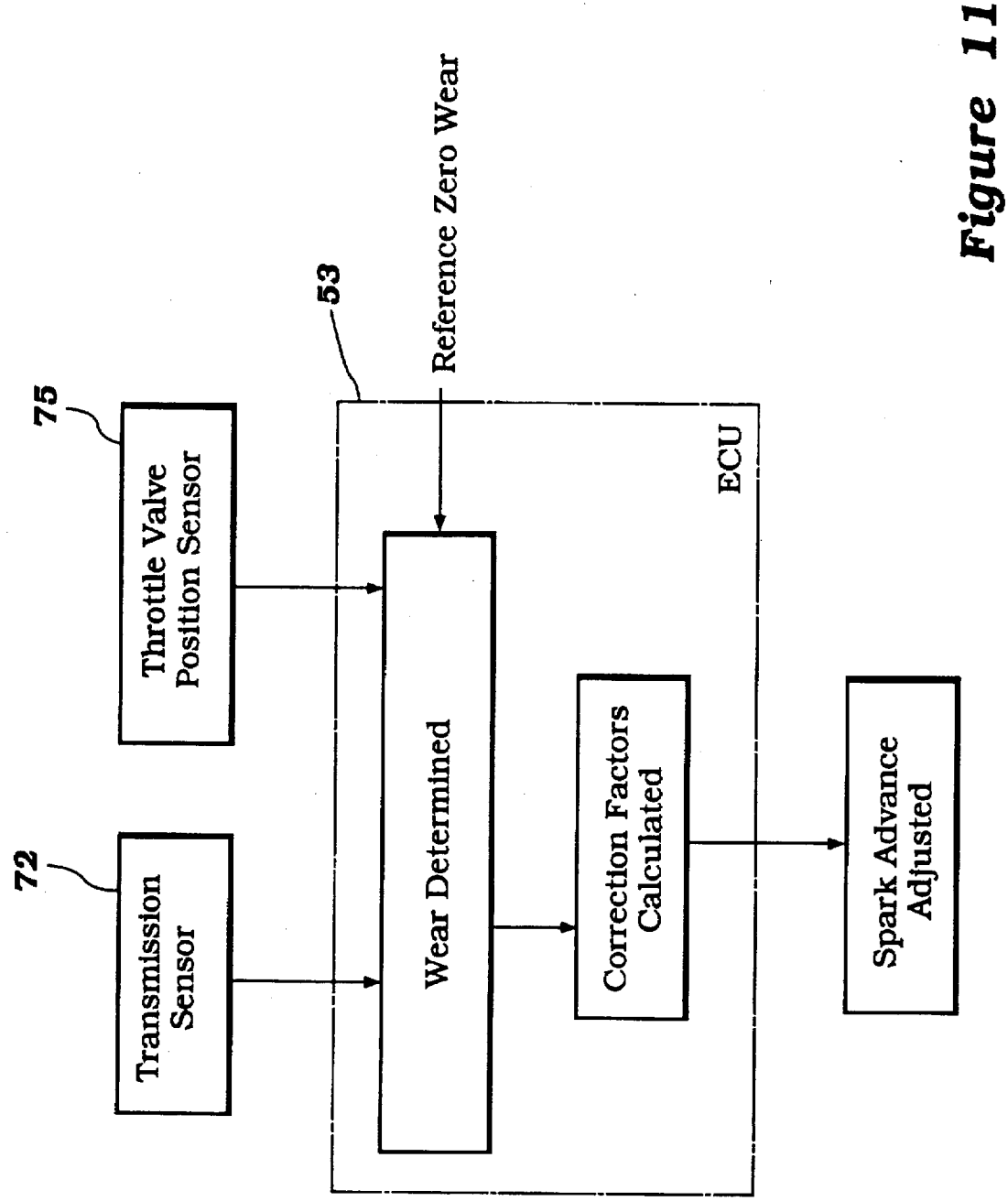
FIG. 11 is a graphical view showing the elements that function to provide the compensation.

This control system for determining the wear in the engine control linkage is further summarized in a general manner in FIG. 11 which shows that the transmission engagement, as signalled to the ECU 53 by the transmission sensor 72, and the pick up point, as signalled to the ECU 53 by the throttle valve position sensor 75 are both compared to known zero references to determine and compensate for the wear in the linkage.

It should be readily apparent from the above that the control mechanisms described ensure that potential problems caused by wear present in the engine control linkage are adequately addressed by the control sequences described which adjust the spark advance angle in response to the wear. Of course the forgoing description is that of preferred embodiments of the invention, and various changes and modifications may be made without departing from the spirit and scope of the invention, as defined by the appended claims.

What is claimed is:

1. An engine control system for an internal combustion engine having at least one combustion chamber, an induction system for delivering at least an air charge to said combustion chamber, a throttle valve in said induction system for controlling the flow therethrough, a manual throttle actuator for operator control, means for operatively connecting said manual throttle actuator to said throttle valve for positioning said throttle valve, said operative connection permitting movement of said manual throttle actuator from an idle position through a pick-up position to a fully opened throttle position, said operative connection providing for a lost motion connection whereby movement of said manual throttle actuator from said idle position to said pick-up position effects no movement of said throttle valve and continued movement of said manual throttle actuator from said pick-up position to said fully opened position effects opening of said throttle valve from a substantially partially opened idle position to a fully opened full throttle position, means for maintaining said throttle valve in said substantially partially opened position when said manual throttle actuator is in a position less than its pick-up position in which the effective flow area of the induction passage is substantially greater than the amount of air necessary for the engine to operate at its idle speed, control means for maintaining the speed of said engine by controlling a system other than said throttle valve during the range when said manual throttle actuator is in positions between its idle position and its pick-up position, a throttle valve position sensor for sensing the position of said throttle valve, said control system controlling the speed of said engine in response to the signal from said throttle valve position sensor, means for determining the degree of movement necessary for said manual throttle actuator to move from its idle position to its pick-up position and for compensating for differences in the degree of movement necessary to begin to open said throttle valve from its idle position in response to changes in condition in the operative connection between said manual throttle actuator and said throttle valve.

2. An engine control system as set forth in claim 1, wherein the means for determining the degree of movement of the manual throttle actuator between its idle position and its pick-up position comprises a position sensor associated with said manual throttle actuator.

3. An engine control system as set forth in claim 2, wherein the amount of movement of the manual throttle actuator from its idle position to its pick-up position is determined by measuring the degree of movement of the manual throttle actuator at the time when the throttle valve position sensor senses initial movement of the throttle valve.

4. An engine control system as set forth in claim 1, wherein the means for determining the degree of movement of the manual throttle actuator from its idle position to its pick-up position comprises a position detector switch associated with the operative connection.

5. An engine control system as set forth in claim 4, wherein the position detector switch is carried by the throttle valve.

6. An engine control system as set forth in claim 5, wherein the position detector switch is disposed in the lost motion connection of the motion transmitting means.

7. An engine control system as set forth in claim 1, wherein the manual throttle actuator comprises a single lever control for operating the throttle and also shifting an associated transmission connecting the engine to a propulsion device from a neutral condition to a drive condition.

8. An engine control system as set forth in claim 7, wherein the means for sensing the degree of movement necessary for the manual throttle actuator to move from its idle position to its pick up position is determined by a transmission condition sensor for sensing when the transmission is shifted from its neutral condition to its drive condition.

* * * * *